United States Patent [19]

Guaraldi et al.

[11] Patent Number: 5,357,858
[45] Date of Patent: Oct. 25, 1994

[54] APPARATUS FOR PREVENTING CIRCUMFERENTIAL SEPARATION BETWEEN A BLANKET CYLINDER GEAR AND A PLATE CYLINDER GEAR

[75] Inventors: Glenn A. Guaraldi, Kingston; Charles L. Krouse, Madbury; Brian J. Gentle, Rochester, all of N.H.

[73] Assignee: Heidelberg Druckmaschinen AG, Heidelberg, Fed. Rep. of Germany

[21] Appl. No.: 26,470

[22] Filed: Mar. 4, 1993

[51] Int. Cl.⁵ .............................................. B41F 5/00
[52] U.S. Cl. ...................................... 101/216; 101/248; 101/183; 74/409
[58] Field of Search ............... 101/212, 216, 248, 181, 101/183, 219, 177; 400/577; 74/409, 440

[56] References Cited

U.S. PATENT DOCUMENTS

| | | | |
|---|---|---|---|
| 2,810,299 | 10/1957 | Partridge | 74/409 |
| 3,174,356 | 3/1965 | Michalec | 74/440 |
| 3,365,973 | 1/1968 | Henden | 74/409 |
| 3,407,727 | 10/1968 | Fischer | 101/177 |
| 3,732,815 | 5/1973 | Greiner et al. | 101/248 X |
| 4,236,448 | 12/1980 | Wieland | 101/216 |
| 4,671,129 | 6/1987 | Lovrenich | 74/409 X |
| 4,953,417 | 9/1990 | Baumgarten et al. | 74/409 |
| 5,085,619 | 2/1992 | Torii et al. | 74/409 X |

FOREIGN PATENT DOCUMENTS

| | | | |
|---|---|---|---|
| 0079184 | 5/1983 | European Pat. Off. | 74/409 |
| 0911080 | 3/1982 | U.S.S.R. | 74/409 |
| 0717486 | 10/1954 | United Kingdom | 101/216 |

*Primary Examiner*—Edgar S. Burr
*Assistant Examiner*—Christopher A. Bennett
*Attorney, Agent, or Firm*—Tarolli, Sundheim & Covell

[57] ABSTRACT

An apparatus for preventing circumferential separation of the meshing teeth (86, 72) of a blanket cylinder gear (84) and a plate cylinder gear (70) includes a first gear (92) having gear teeth (94) in meshing engagement with the gear teeth (86) of the blanket cylinder gear (84). The first gear (92) is rotatable about an axis. A second gear (108) is coaxial with the first gear (92) and is rotatable about the axis relative to the first gear (92). A third gear (136) has gear teeth (134) in meshing engagement with the gear teeth (132) on the second gear (108). A fourth gear (76) is coaxial and rotatable with the plate cylinder gear (72), and has gear teeth (78) in meshing engagement with the gear teeth (134) on the third gear (136). The apparatus further includes spring means (122) for biasing the first and second gears (92, 108) about their common axis in respective directions that are opposite to each other.

2 Claims, 2 Drawing Sheets

APPARATUS FOR PREVENTING CIRCUMFERENTIAL SEPARATION BETWEEN A BLANKET CYLINDER GEAR AND A PLATE CYLINDER GEAR

FIELD OF THE INVENTION

The present invention relates to an apparatus for preventing circumferential separation of the meshing teeth of a driving gear and a driven gear. More specifically, the present invention relates to an apparatus for preventing circumferential separation of the meshing teeth of a driving gear connected to a blanket cylinder and a driven gear connected to a plate cylinder in a printing press.

BACKGROUND OF THE INVENTION

The gear teeth that mesh between a driving gear and a driven gear tend to separate circumferentially when the gears rotate at very high speeds. Thus, in a printing press, the gear teeth on a driving gear which is fixed to a blanket cylinder tend to separate circumferentially from the gear teeth on a driven gear which is fixed to an adjoining plate cylinder when the cylinders rotate at very high speeds. The circumferential separation experienced by such gear teeth in a printing press can cause defects in the printed product.

SUMMARY OF THE INVENTION

An apparatus constructed in accordance with the present invention prevents circumferential separation of the meshing teeth of a driving gear means, which is rotatable about a first axis in a first direction, and a driven gear means which is rotated by the driving gear means about a second axis in a second direction opposite to the first direction. The apparatus comprises means for applying a first circumferential force to the driving gear means. The first circumferential force urges the driving gear means in the first direction. The apparatus further comprises means for applying a second circumferential force to the driven gear means. The second circumferential force urges the driven gear means in a direction opposite to the second direction. The net torque applied to the driven gear means due to the magnitude of the second circumferential force is equal to the net torque applied to the driving gear means due to the magnitude of the first circumferential force.

An apparatus constructed in accordance with the present invention maintains the teeth of the driving gear means and the teeth of the driven gear means in meshing engagement with each other without increasing the amount of torque that is required to rotate the driving gear means and the driven gear means. The apparatus does not increase the required torque because the individual circumferential torques applied to the driving gear means and the driven gear means are equal and opposite to each other. Therefore, the applied circumferential forces do not result in a net load on either the driving gear means or the driven gear means.

In a preferred embodiment of the present invention, the driving gear means comprises a blanket cylinder gear means which is connected to a blanket cylinder in a printing unit. The driven gear means comprises a plate cylinder gear means which is connected to a plate cylinder adjacent to the blanket cylinder in the printing unit. The means for applying circumferential forces to the blanket cylinder gear means and the plate cylinder gear means includes a torsion spring and a plurality of force transmitting gears. The torsion spring exerts forces equally in opposite directions about its axis. The force transmitting gears transmit the equal and opposite forces to the blanket cylinder gear means and to the plate cylinder gear means. The force that is transmitted by the force transmitting gears from the torsion spring to the blanket cylinder gear means is equal and opposite to the force that is transmitted by the force transmitting gears from the torsion spring to the plate cylinder gear means. As a result, there is no net load applied to the blanket cylinder gear means or to the plate cylinder gear means by the torsion spring.

BRIEF DESCRIPTION OF THE DRAWINGS

The foregoing and other features of the present invention will become apparent to those skilled in the art to which the present invention relates from reading the following description with reference to the accompanying drawings, in which.

DESCRIPTION OF PREFERRED EMBODIMENT

Figure 1:
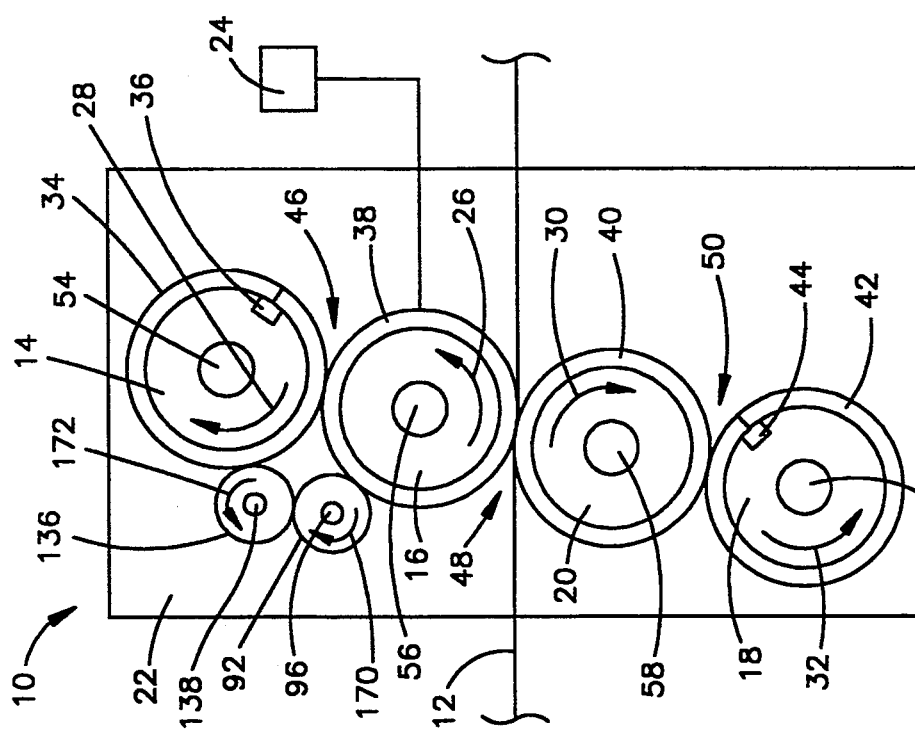
FIG. 1 is a schematic view of a printing apparatus constructed in accordance with the present invention.

A printing unit 10 constructed in accordance with the present invention is shown schematically in FIG. 1. The printing unit 10, by way of example, is an offset lithographic printing unit for printing on opposite sides of a web 12. The printing unit 10 includes an upper plate cylinder 14 and an upper blanket cylinder 16 above the web 12, and a lower plate cylinder 18 and a lower blanket cylinder 20 below the web 12. The cylinders 14-20 are supported for rotation by a frame having a pair of sidewalls 22, one of which is shown in FIG. 1.

A motor 24 drives a gear train (not shown) which rotates the upper blanket cylinder 16 in the direction indicated by the arrow 26 in FIG. 1. The gear train rotates the upper plate cylinder 14 in the direction of the arrow 28. The gear train rotates the lower blanket cylinder 20 in the direction of the arrow 30, and rotates the lower plate cylinder 18 in the direction of the arrow 32.

The upper plate cylinder 14 carries a printing plate 34 which defines an image to be printed. The printing plate 34 is formed as a thin metal sheet, and is mounted on the upper plate cylinder 14 by wrapping the sheet around the upper plate cylinder 14. A locking mechanism 36 in the upper plate cylinder 14 holds the printing plate 34 securely on the upper plate cylinder 14. The upper blanket cylinder 16 carries a printing blanket 38. The printing blanket 38 is formed as a tube which is mounted on the upper blanket cylinder 16 by sliding the tube telescopically over the upper blanket cylinder 16. Another tubular printing blanket 40 is similarly mounted on the lower blanket cylinder 20, and another printing plate 42 is held on the lower plate cylinder 18 by a locking mechanism 44.

When the cylinders 14-20 are being rotated by the motor 24 and the gear train, ink is supplied to both of the printing plates 34 and 42 to form inked images on the printing plates 34 and 42. The inked image on the upper printing plate 34 is transferred to the upper printing blanket 38 at the nip 46 between the upper plate cylinder 14 and the upper blanket cylinder 16. The upper printing blanket 38 subsequently transfers the inked image to the upper side surface of the web 12 at the nip 48 between the upper and lower blanket cylinders 16 and 20. The lower printing plate 42 transfers its inked image to the lower printing blanket 40 at the nip 50 between the lower plate cylinder 18 and the lower blanket cylinder 20. The lower printing blanket 40 subsequently transfers the inked image to the lower side surface of the web 12 at the nip 48. The printing unit 10 thus prints simultaneously on opposite sides of the web 12.

The upper plate cylinder 14 has a shaft 54 that extends into the adjoining side wall 22 of the frame to support the upper plate cylinder 14 for rotation relative to the frame. The upper blanket cylinder 16 has a shaft 56 that extends into the adjoining side wall 22 of the frame to support the upper blanket cylinder 16 for rotation relative to the frame. The lower plate cylinder 18 has a shaft 60, and the lower blanket cylinder 20 has a shaft 58. The shafts 58 and 60 extend into the adjoining side wall 22 of the frame to support the cylinders 18 and 20 for rotation relative to the frame. Each of the printing cylinders 14, 16, 18 and 20 also has a shaft at its opposite end which similarly extends into the other side wall 22 to support the cylinder for rotation relative to the frame.

Figure 3:
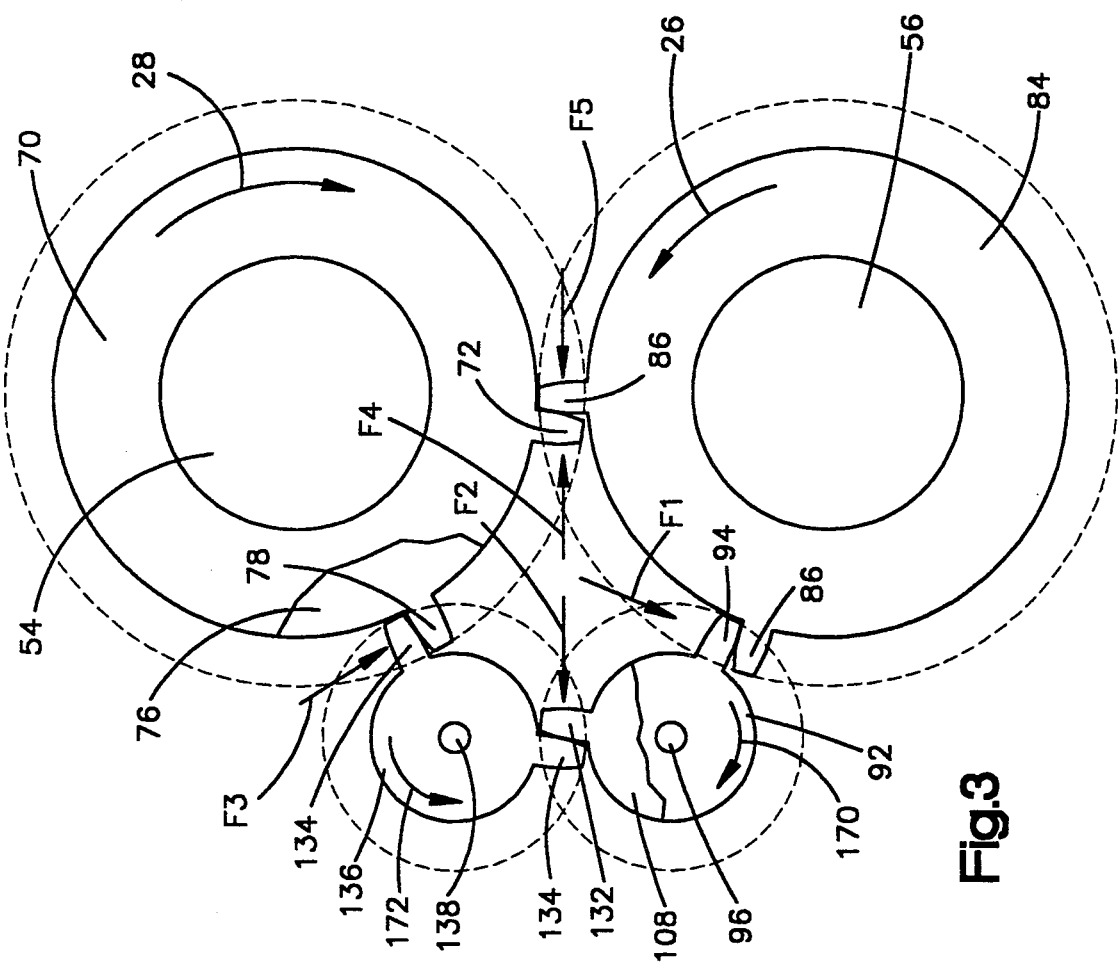
FIG. 3 is a schematic side view of the parts of the apparatus of FIG. 1 that are shown in the exploded view of FIG. 2.
Figure 2:
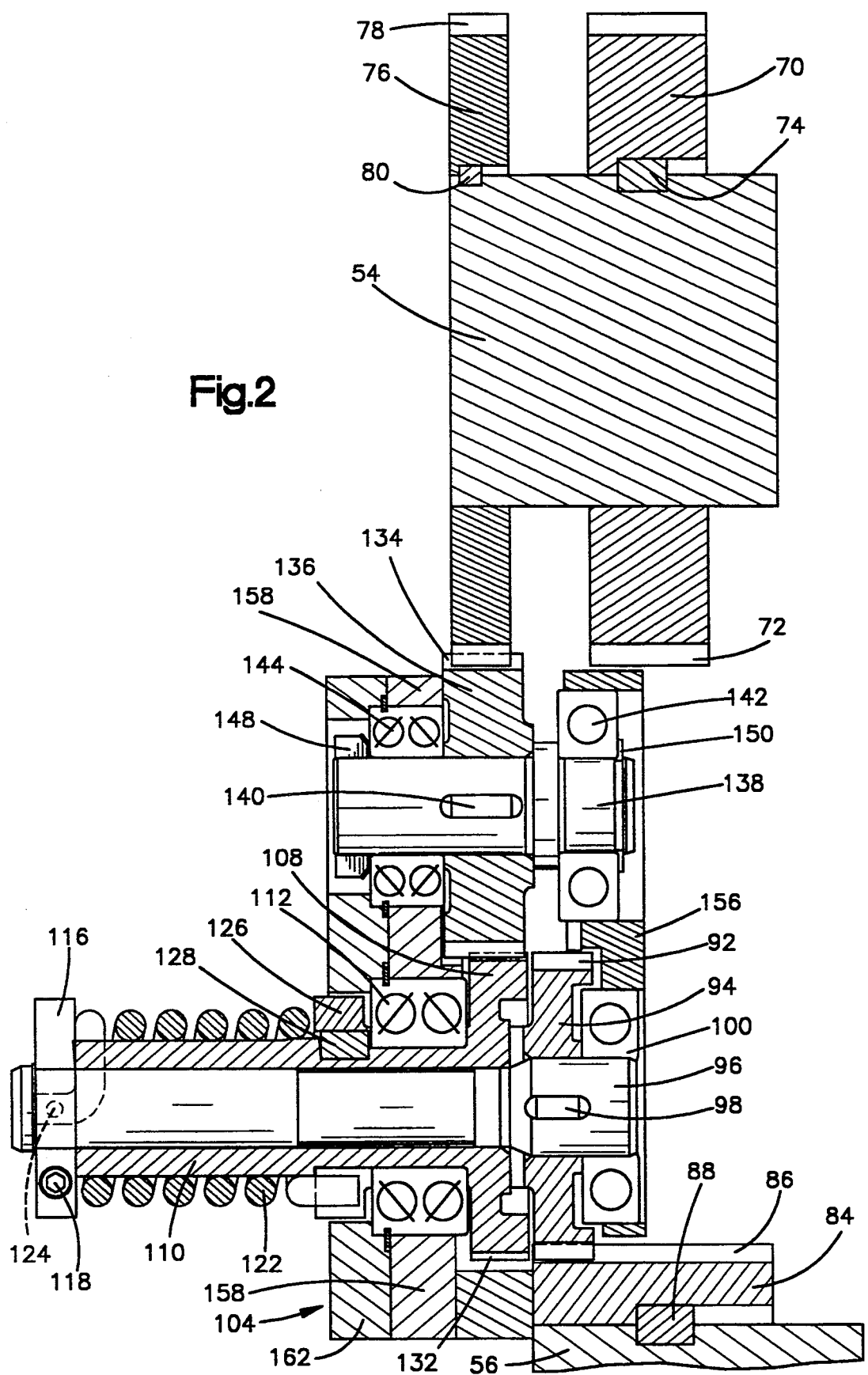
FIG. 2 is an exploded schematic sectional view of parts of the apparatus of FIG. 1.

As shown in FIGS. 2 and 3, a plate gear 70 having teeth 72 is mounted on the shaft 54 of the upper plate cylinder 14 by a spline 74. A gear 76 having teeth 78 is fixedly mounted on the shaft 54 by a key 80. The gears 70 and 76 are coaxial with the shaft 54 and rotate with the shaft 54. A blanket gear 84 having teeth 86 is fixedly mounted on the shaft 56 of the upper blanket cylinder 16 by a key 88. The teeth 86 of the blanket gear 84 mesh with the teeth 72 of the plate gear 70, as shown schematically in FIG. 3.

In the preferred embodiment of the invention, the teeth 72 on the plate gear 70 and the teeth 86 on the blanket gear 84 are helical, and the printing unit 10 further includes a register adjusting mechanism (not shown) of known construction. The register adjusting mechanism moves the plate gear 70 axially along the spline 74. The helical shape of the teeth 72 cause the plate gear 70 and the shaft 54 to rotate relative to the blanket gear 84 when the plate gear 70 moves axially along the spline 74. The register adjusting mechanism thus adjusts the circumferential register of the image transferred from the upper printing plate 34.

A gear 92 has teeth 94 which mesh with the teeth 86 of the blanket gear 84. The gear 92 is fixedly mounted on a shaft 96 (FIG. 2) by a key 98. The shaft 96 is rotatably supported by bearings 100 and 112, shown schematically in FIG. 2, for rotation relative to a frame 104. The frame 104 is fixedly connected to a side wall 22 of the frame of the printing unit 10 by a known means.

A gear 108 is mounted on the shaft 96 for rotation relative to the shaft 96 and the gear 92. The shaft 96 extends through an axially extending cylindrical portion 110 of the gear 108. Bearings 112, shown schematically in FIG. 2, support the gear 108 for rotation relative to the frame 104.

A collar 116 is clamped to the shaft 96 adjacent to the outer end of the cylindrical portion 110 of the gear 108. The collar 116 is clamped to the shaft 96 by a screw 118 so that the collar 116 rotates with the shaft 96. One end of a torsion spring 122 extends into a hole 124 in the collar 116. The other end of the torsion spring 122 is connected to a collar 126 that is fixedly connected to the cylindrical portion 110 of the gear 108 by a key 128. The torsion spring 122 biases the gears 92 and 108 to rotate in opposite directions about the axis of the shaft 96 and thus biases the gears 92 and 108 to rotate relative to each other.

The magnitude of the force of the torsion spring 122 biasing the gears 92 and 108 to rotate relative to each other can be adjusted. An adjustment is made by first turning the screw 118 to unclamp the collar 116 from the shaft 96. The collar 116, which connects the gear 92 to the torsion spring 122, can then be turned on the shaft 96. By turning the collar 116 relative to the collar 126, which is connected to the gear 108, the biasing force of the torsion spring 122 can be adjusted. When a desired biasing force is attained, the collar 116 is again clamped to the shaft 96 by the screw 118.

The gear 108 has teeth 132 which mesh with teeth 134 of a gear 136. The gear 136 is fixedly mounted on a shaft 138 by a key 140. The shaft 138 is supported for rotation relative to the frame 104 by bearings 142 and 144, shown schematically in FIG. 2. A nut 148 threadably engages the shaft 138. The nut 148 and a retainer ring 150 retain the shaft 138 in the frame 104. The teeth 134 of the gear 136 mesh with the teeth 78 of the gear 76 on the shaft 54 of the plate cylinder 14.

The frame 104 has a first end portion 156 that supports the bearings 142 and 100. A central portion 158 of the frame 104 supports the bearings 112 and 144. A second end portion 162 of the frame 104 further supports the bearings 112 and 144, and is clamped to the central portion 158 and the first end portion 156 by a suitable means, such as bolts.

The motor 24 and the drive train drive the blanket gear 84 to rotate in the direction of the arrow 26, as shown in FIG. 3. The teeth 86 of the blanket gear 84 mesh with the teeth 72 of the plate gear 70 to rotate the plate gear 70 in the direction of the arrow 28. The teeth 86 of the blanket gear 84 also mesh with the teeth 94 of the gear 92 to rotate the gears 92 and 108 in the direction of the arrow 170. The teeth 132 of the gear 108 and the teeth 78 of the gear 76 mesh with the teeth 134 of the gear 136 to rotate the gear 136 in the direction of the arrow 172.

The torsion spring 122 applies a force to the gears 92 and 108 which biases the gear 92 to rotate in the direction 170 relative to the gear 108, and which biases the gear 108 to rotate in a direction opposite to the direction 170 relative to the gear 92. Therefore, one of the teeth 94 of the gear 92 applies a circumferential force, indicated by the arrow F1, to one of the teeth 86 of the blanket gear 84. One of the teeth 132 of the gear 108 applies a circumferential force indicated by the arrow F2 to one of the teeth 134 of the gear 136. Another one of the teeth 134 of the gear 136 applies a circumferential force indicated by the arrow F3 to one of the teeth 78 of the gear 76.

The circumferential force F3 is transferred to one of the teeth 72 of the plate gear 70 through the key 80, the shaft 54 and the spline 74 (FIG. 2). Therefore, a circumferential force indicated by the arrow F4 is applied to the plate gear 70 in a direction opposite to the direction of rotation 28 of the plate gear 70. A circumferential force indicated by the arrow F5, which corresponds to the force indicated by the arrow F1, is applied to the blanket gear 84 in the direction of rotation 26 of the blanket gear. The forces F1-F5 are equal. The force F4 applied to the plate gear 70 and the force F5 applied to the blanket gear 84 cause the teeth 86 and 72 to remain in meshing engagement with each other, and thus prevent separation of the plate gear 70 and the blanket gear 84 during high speed operation of the printing unit 10. Since the forces F4 and F5 are equal and opposite, the net torques applied to the plate gear 70 and the blanket gear 84 are equal and opposite. As a result, there is no net load applied to the plate gear 70 or to the blanket gear 84. Therefore, there is no requirement for additional torque to be applied to the blanket gear 84 to rotate the blanket gear 84.

As described above, the register adjusting mechanism rotates the plate gear 70 relative to the blanket gear 84. This causes the gear 76, the gear 136, and the gear 108 to rotate relative to the gear 92 and the blanket gear 84. Such rotation of the gear 108 relative to the gear 92 in one direction will wind the torsion spring 122 up and will thus tighten the torsion spring 122. Such rotation of the gear 108 relative to the gear 92 in the opposite direction will unwind the torsion spring 122 and will thus loosen the torsion spring 122. In accordance with a particular feature of the present invention, the torsion spring 122 is preloaded so as to have a sufficient capacity to undergo such changes in its wound condition in order to accommodate operation of the register adjusting mechanism. Moreover, the torsion spring 122 is preloaded in this manner so as to exert equal and opposite forces against the gears 92 and 108 (as described above) which remain above a predetermined minimum magnitude, and which preferably remain within a predetermined range of magnitudes, throughout any such changes in its wound condition that occur as a result of operation of the register adjusting mechanism. Preferably, the torsion spring 122 is preloaded so as to maintain those forces within the range of 100 to 140 foot pounds.

The plate gear 70 will also rotate relative to the blanket gear 84 when the upper plate cylinder 14 and the upper blanket cylinder 16 are moved radially away from each other for throw-off, as is known. The torsion spring 122 also accommodates such relative rotation of the plate gear 70 and the blanket gear 84 to maintain the associated forces within a predetermined range of magnitudes in the same manner as described above with reference to the register adjusting mechanism.

Although the preferred embodiment of the invention shows the gear 92 meshing with the blanket gear 84, and the gear 136 effectively meshing with the plate gear 70 through the gear 76, the gears 92 and 108 could be interchanged with the gear 136 so that the gear 92 effectively meshes with the plate gear 70 through the gear 76, and the gear 136 meshes with the blanket gear 84. Furthermore, gears similar to gears 92, 108, and 136 could be positioned adjacent the upper blanket cylinder 16 and the lower blanket cylinder 20 and/or adjacent the lower blanket cylinder 20 and the lower plate cylinder 18.

From the above description of the invention, those skilled in the art will perceive improvements, changes and modifications. Such improvements, changes and modifications within the skill of the art are intended to be covered by the appended claims.

Having described the invention, the following is claimed:

1. A printing apparatus comprising:
    a first printing cylinder (16) having means for supporting a first printing member (38);
    a first cylinder gear (84) which is coaxial with and rotatable with said first printing cylinder (16), said first cylinder gear (84) having gear teeth (86);
    a second printing cylinder (14) adjacent to said first printing cylinder (16), said second printing cylinder (14) having means for supporting a second printing member (34) in ink transferring relationship with said first printing member (38) at a nip (46) between said first and second printing cylinders (16, 14);
    a second cylinder gear (70) which is coaxial with and rotatable with said second printing cylinder (14), said second cylinder gear (70) having gear teeth (72) in meshing engagement with said gear teeth (86) on said first cylinder gear (16) so as to establish a driving connection directly between said first and second cylinder gears (84, 70); and
    means for preventing circumferential separation of said gear teeth (86, 72) on said first and second cylinder gears (84, 70) by applying respective torques to said first and second cylinder gears (84, 70) which are equal and opposite to each other and which together apply a net torque with a value of zero;
    said means for preventing circumferential separation including a first torque transmitting gear (92), a second torque transmitting gear (108), a third torque transmitting gear (136), and a fourth torque transmitting gear (76), said torque transmitting gears (92, 108, 136, 76) establishing a torque transmitting gear train which extends between said first and second printing cylinders (16, 14) separately from said driving connection;
    said first torque transmitting gear (92) having gear teeth (94) in meshing engagement with said gear teeth (86) on said first cylinder gear (84) and being rotatable about an axis;
    said second torque transmitting gear (108) being coaxial with said first torque transmitting gear (92) and being rotatable about said axis relative to said first torque transmitting gear (92), said second torque transmitting gear (108) having gear teeth (132);
    said third torque transmitting gear (136) having gear teeth (134) in meshing engagement with said gear teeth (132) on said second torque transmitting gear (108);
    said fourth torque transmitting gear (76) being coaxially fixed to and rotatable only with said second printing cylinder (14) and said second printing cylinder gear (70), said fourth torque transmitting gear (70) having gear teeth (76) in meshing engagement with said gear teeth (134) on said third torque transmitting gear (136); and
    said means for preventing circumferential separation further including spring means (122) for biasing said first and second torque transmitting gears (92, 108) about said axis in respective directions that are opposite to each other.

2. Apparatus as defined in claim 1 wherein said first printing cylinder (16) is a blanket cylinder having means for supporting a printing blanket (38), said second printing cylinder (14) being a plate cylinder having means for supporting a printing plate (34) in ink transferring relationship with said printing blanket (38) at said nip (46) between said printing cylinders (16, 14).

* * * * *